United States Patent
Moncada Rodriguez

(10) Patent No.: US 9,677,536 B2
(45) Date of Patent: Jun. 13, 2017

(54) WATER GRAVITY LOOP POWER PLANT (WGLPP)

(71) Applicant: Oscar Edgardo Moncada Rodriguez, Chapel Hill, NC (US)

(72) Inventor: Oscar Edgardo Moncada Rodriguez, Chapel Hill, NC (US)

( * ) Notice: Subject to any disclaimer, the term of this patent is extended or adjusted under 35 U.S.C. 154(b) by 0 days.

(21) Appl. No.: 13/925,830

(22) Filed: Jun. 25, 2013

(65) Prior Publication Data

US 2014/0250879 A1   Sep. 11, 2014

Related U.S. Application Data

(60) Provisional application No. 61/775,776, filed on Mar. 11, 2013.

(51) Int. Cl.
*F03B 17/00* (2006.01)

(52) U.S. Cl.
CPC .................. *F03B 17/005* (2013.01)

(58) Field of Classification Search
CPC ...................................... F03B 17/005
USPC ........ 60/916, 495–507; 290/42, 43; 415/916
See application file for complete search history.

(56) References Cited

U.S. PATENT DOCUMENTS

| | | | | |
|---|---|---|---|---|
| 515,674 A | * | 2/1894 | Guldhaug | 60/639 |
| 3,375,664 A | * | 4/1968 | Wells, Jr. | F02C 1/10 310/11 |
| 4,312,167 A | * | 1/1982 | Cazaly | E04B 1/3505 29/445 |
| 4,324,984 A | * | 4/1982 | Borgren | 290/54 |
| 4,392,062 A | * | 7/1983 | Bervig | F03B 17/005 290/1 R |
| 4,816,697 A | * | 3/1989 | Nalbandyan et al. | 290/54 |
| 5,905,312 A | * | 5/1999 | Liou | 290/54 |
| 7,091,628 B1 | * | 8/2006 | Balt | F03B 17/00 290/43 |
| 7,222,487 B1 | * | 5/2007 | Hinkley | 60/639 |
| 7,872,365 B2 | * | 1/2011 | Rourke | F03B 13/20 290/42 |
| 8,166,760 B2 | * | 5/2012 | Fiske | 60/639 |
| 8,492,918 B1 | * | 7/2013 | Kamenov | F03D 9/025 290/43 |
| 8,516,812 B2 | * | 8/2013 | Manakkattupadeettathil | 60/495 |
| 8,839,616 B1 | * | 9/2014 | Perez | 60/398 |

(Continued)

FOREIGN PATENT DOCUMENTS

| | | | | |
|---|---|---|---|---|
| CN | 101413473 A | * | 11/2008 | |
| DE | 3716093 A1 | * | 1/1988 | ............ F03B 17/005 |
| DE | 4035870 A1 | * | 5/1992 | ............ F01K 27/005 |

(Continued)

OTHER PUBLICATIONS

DE 4035870 A1 Englsih Translation.*

*Primary Examiner* — Phutthiwat Wongwian
*Assistant Examiner* — Jessica Kebea

(57) ABSTRACT

The WGLPP is a non-fluvial/dam, complete micro Hydroelectric Power Plant that can be an attached/integrated installation, a non-attached installation, or a portable installation (vehicle) that will continuously (24/7) power any residential, commercial, or military building. The WGLPP is driven by a water gravity energy loop (potential energy to kinetic energy to potential energy . . . ), which is clean (zero emissions and zero environmental impact) and renewable energy.

3 Claims, 6 Drawing Sheets

(56) References Cited

U.S. PATENT DOCUMENTS

2011/0204645 A1\* 8/2011 Jacobson ................ 290/54

FOREIGN PATENT DOCUMENTS

| DE | 102009033794 A1 | \* | 1/2011 | |
|----|----|----|----|----|
| FR | 447326 A | \* | 12/1912 | ............ F03B 17/005 |
| JP | 2008069765 A | \* | 3/2008 | |
| LI | DE 10049372 A1 | \* | 4/2002 | ............ F03B 17/005 |
| OA | 9727 | \* | 2/1993 | |
| WO | WO2004094816 A1 | \* | 11/2004 | |

\* cited by examiner

FIG. 5
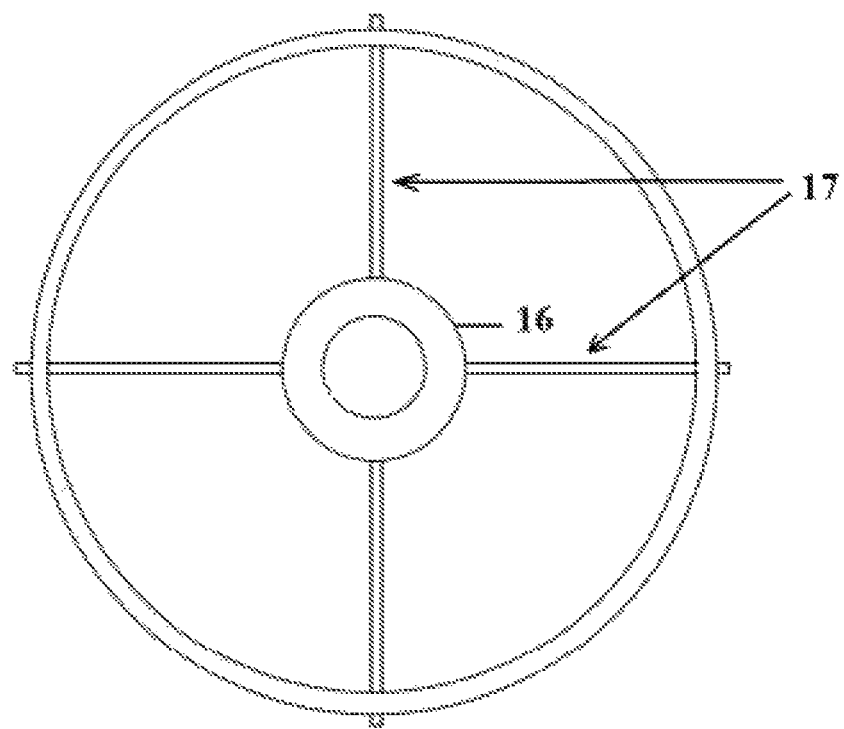
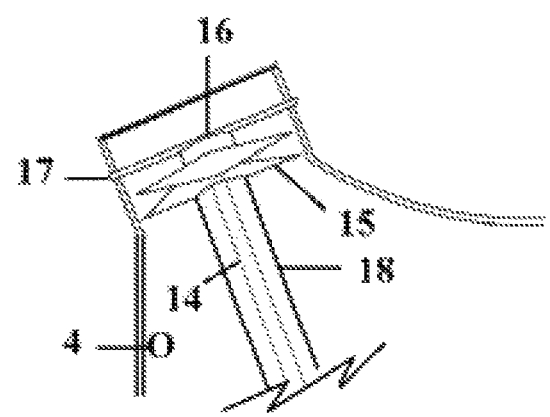

WATER GRAVITY LOOP POWER PLANT (WGLPP)

BACKGROUND OF THE INVENTION

My research shows that "Buildings accounted for 41% (40 quads) of the primary energy consumption in the USA in 2010, greater than that attributable to either transportation (28%) or industry (31%). This represented a cost of approximately $400 billion in 2010 dollars. Buildings consumed 74% of the electricity generated in the USA, and 34% of the natural gas production. This led to buildings being responsible for 40% of the carbon dioxide emissions in the USA, or 7.4% of the total global carbon dioxide emissions [2011 Buildings Energy Data Book, EREN, US DOE]."

The Water Gravity Loop Power Plant (WGLPP) is a non-fluvial/dam, complete micro Hydroelectric Power Plant, which is capable of generating clean (zero dioxide emissions and zero environmental impact), renewable energy because is generated by the conversion of water gravity/energy to mechanical power.

The WGLPP can be an attached/integrated system installation, a non-attached system installation, or a portable system installation (on mobile platform or vehicle). The WGLPP can be structurally and cosmetically integrated with new or modified residential, commercial, or military buildings, which can be modified to have the required Hydraulic Head and the required structure to install the WGLPP. The WGLPP water gravity energy loop continuous energy conversion sections and components will be customized (shape, size, capacity, material . . . ) and optimized to the end users or buyers performance requirements.

My vision and the objective of my invention is that the WGLPP will generate the required electricity to continuously (24/7) power any residential, commercial, or military building (multifloors building; any industrial plant or factory; any data center building; any farm; any portable building; and any other feasible application/integration).

My vision is to make the users of the WGLPP self-sufficient and energy independent.
The WGLPP will be offered at a cost-effective price, will be custom built for optimized performance based on the end user performance requirements, economically sustainable, and environmentally friendly (zero emissions, renewable energy, and zero environmental impact).

My invention uses, integrates and applies Water Storage technologies; Hydraulics principles; Hydrodynamics principles; Fluid Mechanics and Fluid Dynamics principles; Fluid Conveyance technologies (metal and non-metal); Propeller and Impeller science and technology; Electricity Generation science and technology; Lubrication-Free Bearings technology; Wireless technology; Solar Power technology; Wind Power technology; Sensor Technology; Computer Science Technology; Predictive Analytics; any other applicable principles/technology; and the required Best Practices frameworks, process, and technologies to measure-document, monitor-alert, configure, control and manage the WGLPP. To continuously improve the WGLPP, I will use any new applicable and feasible technologies, new discoveries, and users/operators lessons learned and monitored performance feedback.

BRIEF SUMMARY OF THE INVENTION

WGLPP is a non-fluvial/dam, complete micro Hydroelectric Power Plant that can be attached/integrated, non-attached, or portable (vehicle) system installation, driven by a water gravity energy loop (potential energy to kinetic energy to potential energy . . . ); is made of five (5) or more clean (zero emissions and zero environmental impact) and renewable energy conversion sections or modules, which will convert the falling water energy to mechanical power by the use of extra-wide high performance axial flow (AL) propeller(s) and impeller(s). The sections or modules are: 1. Hydraulic Head section. 2. Driving-Generation-Acceleration section 3. Acceleration-Driving-Pumping section. 4. Suction-Pumping-Return section. 5. Metal Structure section. All sections will be customized (shape, size, capacity, material . . . ) to the performance requirements of the end user or buyer. See Drawing #1.

Figure 1:
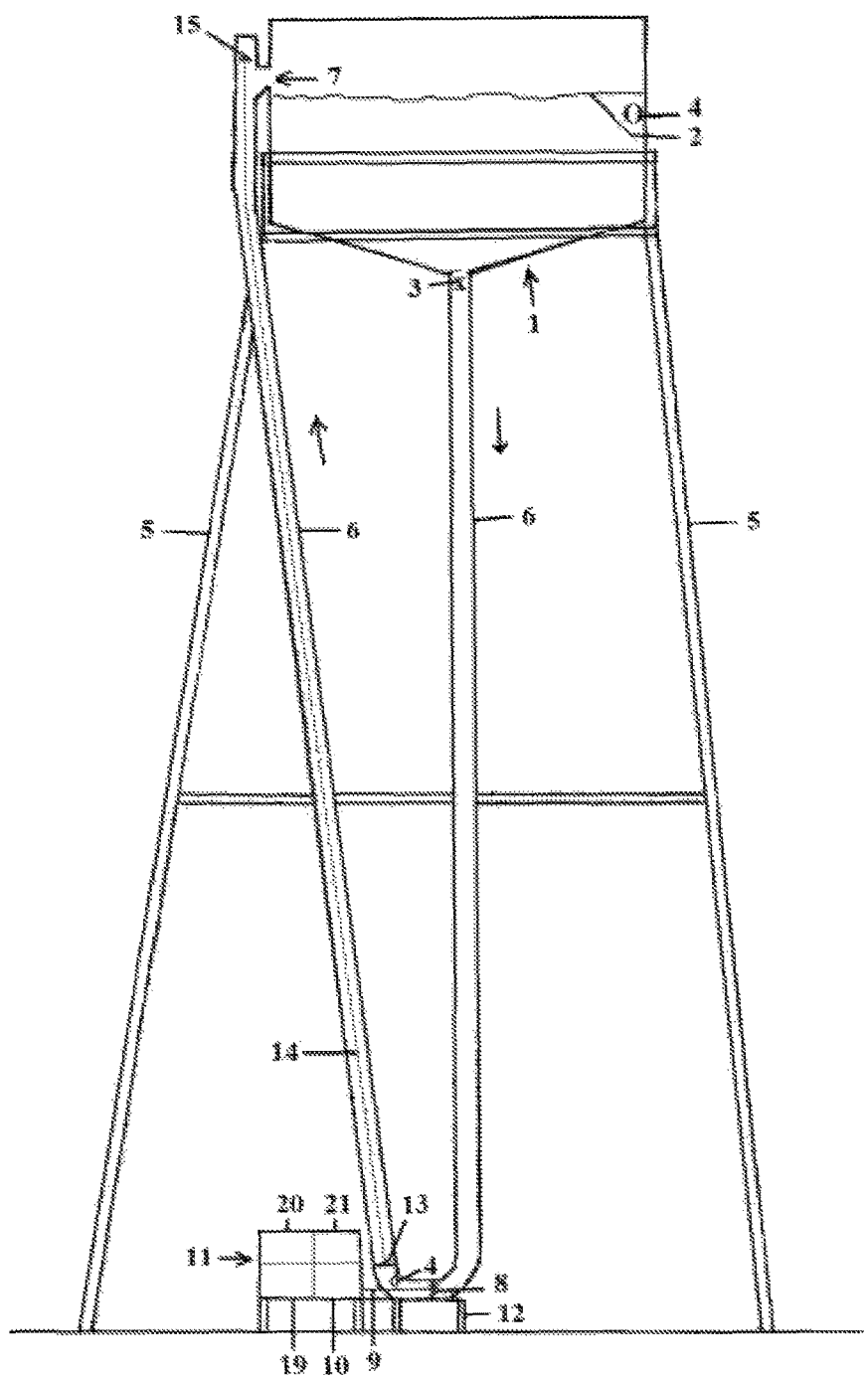
FIG. 1: This drawing shows the five sections of the WGLPP, which are: 1. Hydraulic Head section 2. Driving-Generation-Acceleration section. 3. Acceleration-Driving-Pumping section. 4. Suction-Pumping-Return section. 5. Metal structure section. The design and location of sections 1, 2, 3, 4, and 5 will be customized based on the performance requirements of the end user or buyer.
Figure 2:
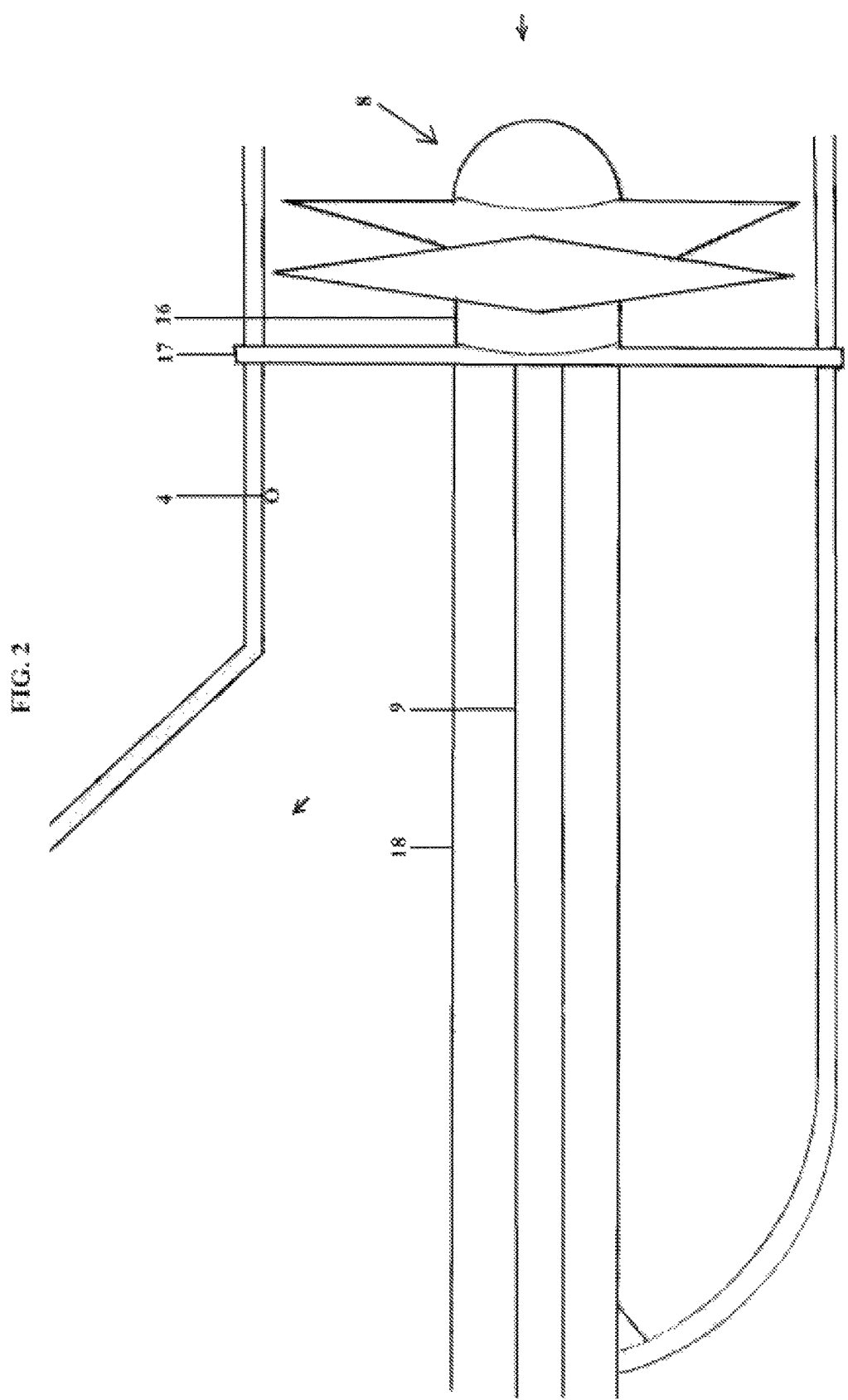
FIG. 2—Section 2

This drawing shows section 2, which is where the Driving of the generator shaft is done by the rotations of the propeller's shaft, which ultimately results in electricity Generation; and at the same time the AF propeller Accelerates (pumps) the water to section 3. It will be customized as required FIG. 3—Section 2 and 3

This drawing shows parts of sections 2 and 3, which includes the nacelle of section 2 and the AF propeller of section 3. The location of the nacelle in section 2 will be customized as required and sections 2 and 3 components customized (shape, size, capacity, material . . . ) as required.

FIG. 4—Section 3

This drawing shows section 3, which is where the accelerated water from section 2 is accelerated again, the interconnection cable to section 4 is rotated to drive the impeller and the water is pumped to section 4 where is pumped to section 1. Design and location will be customized as required.

FIG. 5—Strut Bearing System

This drawing shows the propellers and impellers support system, which includes the lubrication-free bearing and the metal or similar strength strut that supports it. Will be customized as required.

Figure 6:
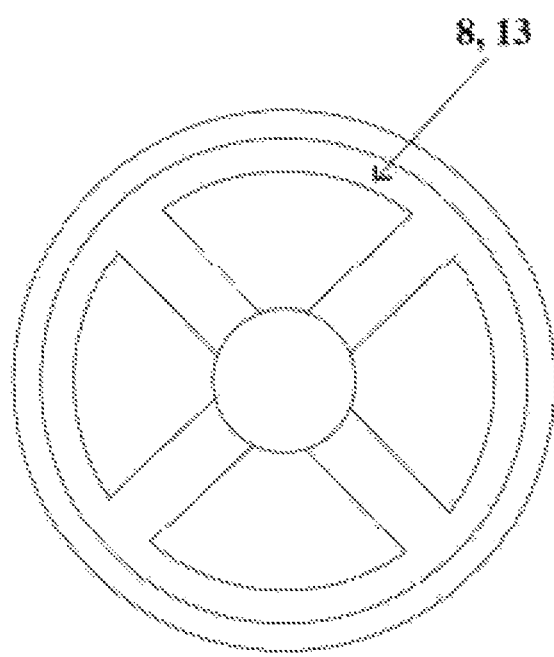

FIG. 6—Extra wide high performance Axial Flow (AF) Propeller

This drawing shows the extra wide high performance AF propeller, which is made of metal or similar strength material. Design will be customized (shape, size, capacity, material . . . ) as required.

DETAILED DESCRIPTION OF THE INVENTION

The WGLPP is a non-fluvial/dam, complete micro Hydroelectric Power Plant that can be an attached/integrated system installation, a non-attached system installation, or a portable system installation (mobile platform, vehicle) to/with the building(s) it will power. The WGLPP is driven by a water energy loop (potential energy to kinetic energy to potential energy . . . ); is made of five (5) or more clean (zero emissions and zero environmental impact) and renewable energy conversion sections or modules, which will convert the falling water energy to mechanical power by the use of an extra-wide high performance axial flow (AL) propeller(s) and impeller(s). The sections or modules are:
1. Hydraulic Head section.
2. Driving-Generation-Acceleration section
3. Acceleration-Driving-Pumping section.
4. Suction-Pumping-Return section.
5. Metal structure section.

The WGLPP will convert the falling water flow/pressure (energy) into mechanical power to:

a) Generate electricity by the rotations of the generator shaft that is rotated by the mechanical power generated by the propeller and transmitted by its interconnected power shaft.

b) Accelerate and push/pump the water by the use of extra-wide high performance axial flow (AL) propeller(s).

c) Pump/suction the water by the use of high performance impeller(s) to return the water back to the water tank to complete one full loop-cycle and to start a new loop-cycle.

The WGLPP is integrated and installed on Section 5, which can be a metal structure or similar strength structure (required frame) that is attached to the required footings or foundation on the ground or the appropriate surface or mobile platform. The structure can be designed and built as part of the building structure were the WGLPP will be installed.

Section 1 is located at the top of Section 5 and is made of the required (shape, size, capacity, material . . . ) elevated insulated-heated cone shape bottom water tank (attached/integrated or non-attached to the building it will power) and its monitoring and control systems (sensors and controls, overflow/vents, filters, drains, shut off valves, one-direction flow control valves, Predictive Analytics system, required software, centralized visualization and control dashboard, and required system networks).

FIG. #1 depicts an elevated insulated-heated covered cone shaped bottom tank 1, a liquid 2, valve 3, and sensors 4. A metal structure 5 supporting elevated tank and supporting U shaped pipe 6 from the outlet of tank bottom to the return intake 7 of tank. A high pitch axial flow propeller 8, a propeller shaft 9 from high pitch axial flow propeller 8 to the generator 10. A nacelle 11 encloses the generator 10, the voltage regulator 19, the controller 20, and the grid-tie inverter 21. A structure 12 supports the nacelle 11 and the U shaped pipe 6. A low pitch axial flow propeller 13 near and after high pitch axial flow propeller 8. A propeller shaft 14 connects the low pitch axial flow propeller 13 to impeller 15.

Section 2 is made of the required (shape, size, capacity, material . . . ) insulated-heated conveyance pipes controlled by one-direction flow control check-valves, shut off valves, and drain/vent systems; extra wide high performance AF propeller(s) and its strut-bearing (lubrication-free) mounting assembly and systems; propeller to generator interface-driver power shaft assembly and systems; a generator nacelle to enclose the electricity generator(s) and its supply and interface systems with building and required monitoring and control systems (like Section 1) for a continuous, high quality, safe, and controlled electrical power supply. The design and location of the nacelle will be customized as required (shape, size, capacity, material . . . ).

FIG. #2 depicts a high pitch axial flow propeller 8, a sensor 4, a bearing 16 to support high pitch axial flow propeller 8, struts 17 to support bearing 16, propeller shaft 9 of high pitch axial flow propeller 8, and a housing 18 of propeller shaft 9.

Section 3 is made of the required (shape, size, capacity, material . . . ) insulated-heated conveyance pipes (wider than section 2) controlled by one-direction flow control check-valves, shut off valves, and drain/vent systems; extra wide high performance AF propeller(s) and its strut-bearings (lubrication-free) mounting assembly and systems; propeller(s) to impeller(s) interconnection flex cable or appropriate interconnection system and assembly to drive impeller(s) in section 4 and its monitoring and control systems (like Section 1).

Figure 3:
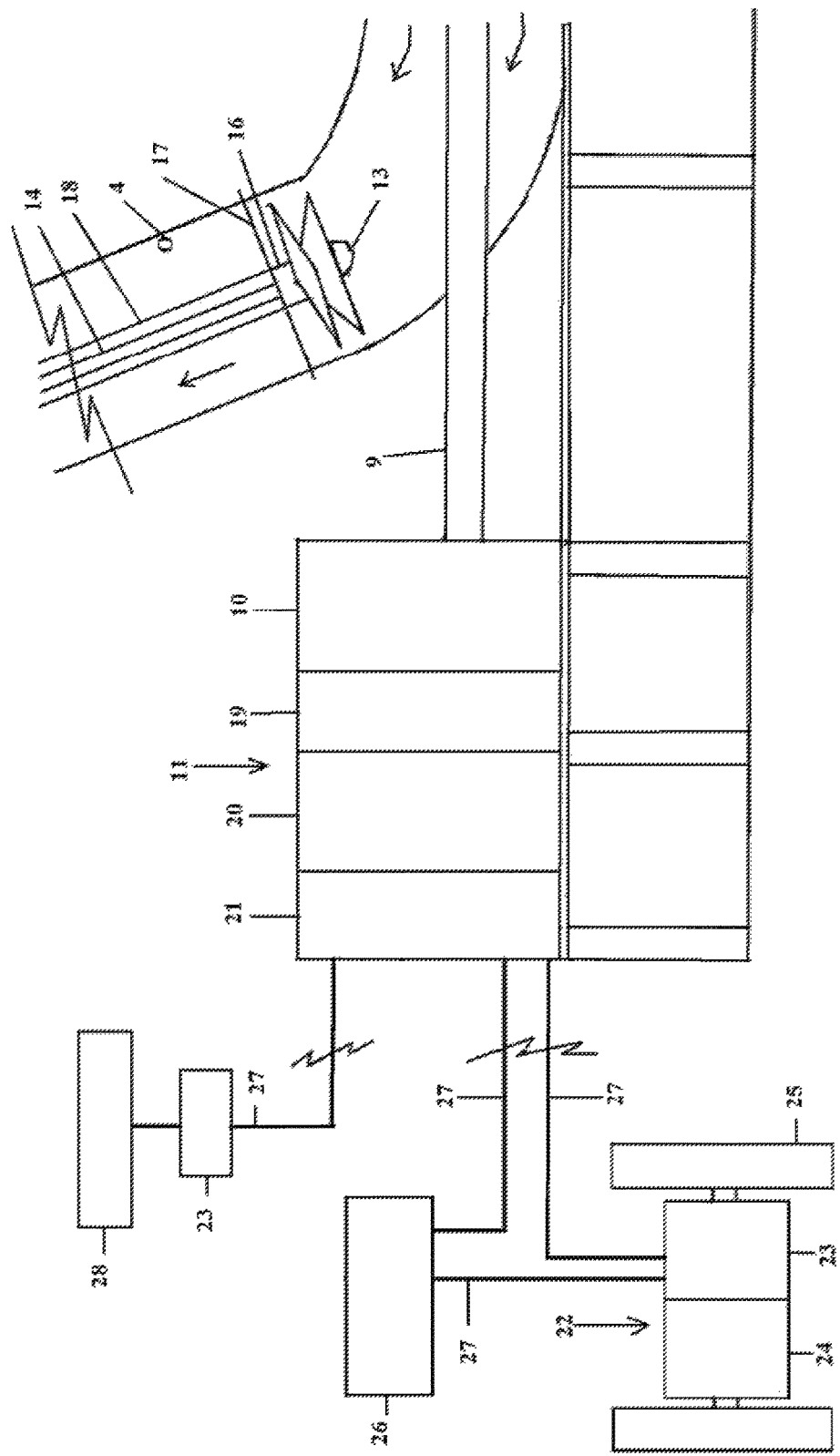
Figure 4:
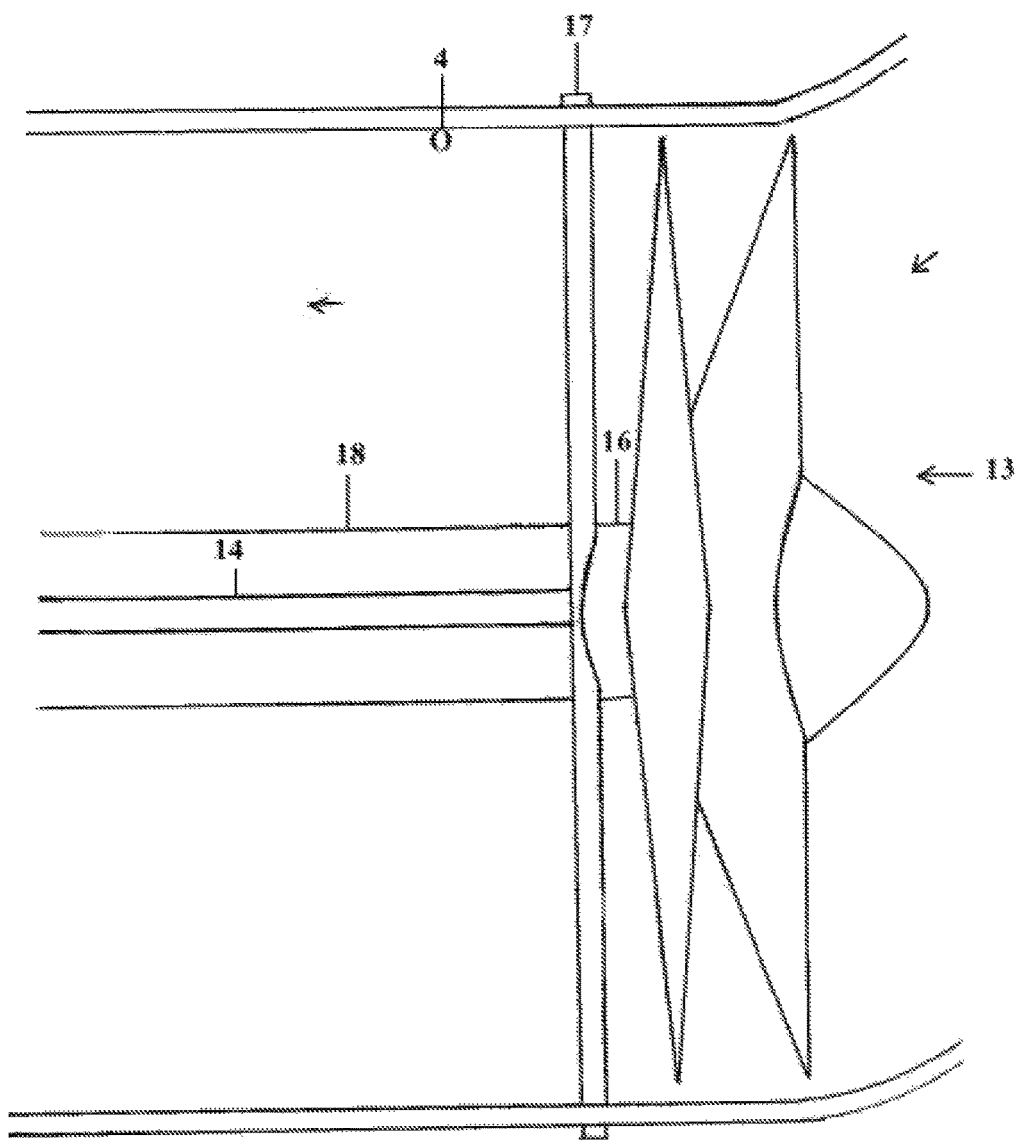

FIG. 3 depicts a low pitch axial flow propeller 13 near and after high pitch axial flow propeller 8, a housing 18 of propeller shaft 14, strut 17, bearing 16, a sensor 4, an AC or DC generator 10 connected to propeller shaft 9, a voltage regulator 19, a controller 20, a grid-tie inverter 21, a nacelle 11, a power train or propulsion system 22 that includes an electric motor 23, a gear box 24, wheels 25, battery 26, and supply 27. Alternatively, the electric motor 23 powers an industrial machine 28.

Section 4 is made of the required (shape, size, capacity, material . . . ) insulated-heated conveyance pipes (wider than section 2) controlled by one-direction flow control check-valves, shut off valves, filter, and drain/vent systems; the Impeller(s)-Return port assembly at water tank and its strut-bearings (lubrication-free) mounting assembly and systems including additional impeller(s) powered by the electricity generated by the WGLPP and/or, solar energy, or wind power as required and its monitoring and control system (like Section 1).

FIG. #4 depicts a low pitch of axial flow propeller 13, bearing 16, struts 17, a sensor 4, propeller shaft 14 connecting the low pitch axial flow propeller 13 propeller to impeller 15, the housing 18 of propeller shaft 14, strut 17, and bearing 16.

FIG. #5 depicts a bearing 16, a sensor 4, struts 17, an impeller 15, and a housing 18 of propeller shaft 14.

FIG. #6 depicts axial flow propellers 8 and 13.

Guidelines how to Build the WGPP

In order to build a cost-effective; optimized to user performance requirements; and a sustainable system; the WGFPP will be customized to the specific requirements of the purchaser or end user and should meet the all applicable legal requirements and best industry practices.

These guidelines are critical steps to get the proper processes integrated and implemented. The processes should be tested and validated against user requirements, and evaluated and improved as required before completing the transition to normal operation. The Empirical Process Control, which includes visualization (transparency), inspection, and adaptation is recommended.

1. Determine the electricity requirements in Kilowatts per hour for a 24/7 service based on present and future needs, weather conditions, and applicable best practices and regulations.

2. To build Section 2: Determine the generator or alternator capable of generating the required KW/hr.; determine the required interface (generator shaft to propeller shaft) with the propeller driver shaft; required voltage regulator; determine the required monitoring and control system; required safety/protection systems, and required interface systems (WGLPP to building) with building that will be supplied with electrical power. Design the generator nacelle to provide an optimal and safe operation based on operational and environmental factors like weather, terrain, zoning restrictions, space available, and required factors.

3. To build Sections 1 and 2: Determine the required hydraulic head, water flow/volume, pipe size, propellers, one-direction check valves, and strut-bearing (Lubrication- Free) system to generate the required RPM and torque to meet the generator requirements.

4. To build Section 1: Determine the required water tank and monitoring and control system to provide the required continuous water flow for the system plus a safety amount to compensate for water loss. Design the water supply and control system to assure the required water level on a 24/7 basis.

5. To build Section 3: Determine the right propellers, pipe size (larger than section 2), bearing-strut system, one-way check valve, and interconnection cable or proper interconnection link to impeller in section 4 to be able to pump back the water to the tank in section 1.

Determine the required monitoring and control system.

6. To build Section 4: Determine the right impellers, pipe size (larger than section 2); strut-bearing systems, one-way check valve, and connection to cable from section 3. Determine the need and suitability for additional impellers powered by the WGLPP, or solar and/or wind power as required. Determine the required monitoring and control system.

7. To install the monitoring and control systems all Sections: Determine the right location for monitoring and control systems (sensors and controls, overflow/vents, filters, drains, shut off valves, one-direction flow control valves, Predictive Analytics system, required software, centralized visualization and control dashboard, and required system networks) in sections 1, 2, 3, 4, and 5 and for maintenance purposes.

8. To build Section 5: Design the required structure to accommodate all the sections; determine the required security and safety best practices to protect the WGLPP and its users/operators.

9. System Integration: a) Install or build the structure b) Install the water tank c) Install all other sections as required, d) Install and integrate the monitoring and control systems.

Test and validate all sections individually before they are assembled/integrated.

How to Use the WGLPP

To transition from the installation to the operation of the WGLPP, a qualified technician will explain and teach the user how the system works, how to operate it (Normal and Emergency Procedures), and proactive/preventive maintenance guidelines.

1. Verify that the operation of the required monitoring and control systems; centralized visualization and control dashboard; required system networks; required safety and protection systems, and required system interface with building to be powered with electricity are working properly. Verify that the proper legal requirements have been met.

2. Close (manually or electrically) the shut off valve located at the bottom of the tank.

3. Open the water supply for the tank to fill it to the required level.

4. When the tank reaches the required level (controlled by sensor), open the shut off valve to start the electricity generation.

5. Check all monitors and indicators to confirm a proper operation and adjust accordingly.

I claim:

1. A Water Gravity Loop Power Plant (WGLPP) to generate clean, continuous, resilient, portable, and renewable electricity comprising:

an elevated covered cone shaped bottom tank of a first volume configured to contain a liquid, the elevated covered cone shaped bottom tank comprising a bottom outlet and a side inlet, the elevated covered cone shaped bottom tank configured to provide a hydraulic head pressure of said liquid based on the height and shape of the elevated covered cone shaped bottom tank, the elevated covered cone shaped bottom tank controlled by its comprised monitoring and control system and protected by its insulation;

a U shaped pipe comprising a first end and a second end, the first end coupled to the bottom outlet of the elevated covered cone shaped bottom tank and the second end coupled to side inlet of elevated covered cone shaped bottom tank;

a pressurized liquid flow loop coupled from the bottom outlet of elevated covered coned shape bottom tank to the side inlet of elevated covered coned shape tank;

a metal or its steel equivalent structure supporting and integrating the Water Gravity Loop Power Plant;

at least two strut-bearing mounting assemblies and systems comprising struts and bearings coupled to points on the U shaped pipe and coupled to the high performance axial flow propeller;

a high performance axial flow propeller mounted within the U shaped pipe, the high performance axial flow propeller configured to be driven by fluid flow from the bottom outlet of the elevated covered cone shaped bottom tank;

a shaft coupled to the high performance axial flow propeller and further coupled to an electric generator, the generator comprising a nacelle and its supply and interface system;

a voltage regulator coupled to the electric generator;

a one direction control valve and sensor coupled to the U shaped pipe that are comprised in its monitoring and control system and configured to control the flow of liquid through the U shaped pipe; and insulation protecting nacelle and U shaped pipe.

2. The Water Gravity Loop Power Plant (WGLPP) of claim 1, further comprising:

a vehicle propulsion system comprising an electric motor, power supply coupled to the generator, and further coupled to the voltage regulator;

a battery coupled to the generator and the battery configured to be charged by the generator, the battery configured to provide power to the vehicle propulsion system.

3. The Water Gravity Loop Power Plant (WGLPP) of claim 1, further comprising:

an electric motor configured to be powered by the generator, the electric motor configured to power an industrial machine.

* * * * *